(12) United States Patent
Doi et al.

(10) Patent No.: US 9,370,901 B2
(45) Date of Patent: Jun. 21, 2016

(54) RESIN COMPOSITION, OPTICAL COMPENSATION FILM USING THE SAME AND PRODUCTION METHOD OF OPTICAL COMPENSATION FILM

(75) Inventors: Tohru Doi, Mie (JP); Takahiro Kitagawa, Mie (JP); Takashi Fukuda, Mie (JP); Shinsuke Toyomasu, Mie (JP)

(73) Assignee: TOSOH CORPORATION, Shunan-shi (JP)

( * ) Notice: Subject to any disclaimer, the term of this patent is extended or adjusted under 35 U.S.C. 154(b) by 107 days.

(21) Appl. No.: 14/235,948

(22) PCT Filed: Jul. 26, 2012

(86) PCT No.: PCT/JP2012/068987
§ 371 (c)(1),
(2), (4) Date: Jan. 29, 2014

(87) PCT Pub. No.: WO2013/018651
PCT Pub. Date: Feb. 7, 2013

(65) Prior Publication Data
US 2014/0153096 A1    Jun. 5, 2014

(30) Foreign Application Priority Data

Jul. 29, 2011 (JP) .................. 2011-166594
Jun. 22, 2012 (JP) .................. 2012-141108

(51) Int. Cl.
| | | |
|---|---|---|
| *C08L 1/10* | (2006.01) | |
| *C08L 1/12* | (2006.01) | |
| *C08L 35/02* | (2006.01) | |
| *B29C 69/02* | (2006.01) | |
| *G02B 1/04* | (2006.01) | |
| *G02B 5/30* | (2006.01) | |
| *C08L 1/14* | (2006.01) | |
| *B29C 41/02* | (2006.01) | |

(52) U.S. Cl.
CPC .................. *B29C 69/02* (2013.01); *B29C 41/02* (2013.01); *C08L 1/10* (2013.01); *C08L 1/12* (2013.01); *C08L 1/14* (2013.01); *C08L 35/02* (2013.01); *G02B 1/041* (2013.01); *G02B 5/3083* (2013.01); *G02F 2413/11* (2013.01)

(58) Field of Classification Search
CPC .............. C08L 1/10; C08L 1/12; C08L 35/02
See application file for complete search history.

(56) References Cited

U.S. PATENT DOCUMENTS

| 2002/0102369 A1 | 8/2002 | Shimizu et al. | |
| 2005/0142304 A1* | 6/2005 | Kawanishi | C08J 5/18 428/1.31 |
| 2006/0029750 A1 | 2/2006 | Shimizu et al. | |
| 2007/0076155 A1* | 4/2007 | Nakayama | G02F 1/13363 349/118 |

FOREIGN PATENT DOCUMENTS

| FR | 1473712 A | * 3/1967 | .............. C08L 31/04 |
| JP | 5 297223 | 11/1993 | |
| JP | 5 323120 | 12/1993 | |
| JP | 2818983 | 10/1998 | |
| JP | 2001 343526 | 12/2001 | |
| JP | 2002 20410 | 1/2002 | |
| JP | 2006 328132 | 12/2006 | |
| JP | 2007-328371 A | 12/2007 | |
| JP | 2008 64817 | 3/2008 | |
| JP | 2008120851 A | * 5/2008 | |
| JP | 2008 224840 | 9/2008 | |
| JP | 2009037110 A | * 2/2009 | |
| JP | 2009 197247 | 9/2009 | |
| JP | 2011 137051 | 7/2011 | |

OTHER PUBLICATIONS

Machine translated English language equivalent of JP 2009-037110 (Feb. 2009, 12 pages).*
Machine translated English language equivalent of FR 1473712 (Mar. 1967, 8 pages).*
Machine translated English language equivalent of JP 2008-120851 (May 2008, 10 pages).*
International Search Report Issued Aug. 21, 2012 in PCT/JP12/068987 Filed Jul. 26, 2012.
Office Action issued Apr. 14, 2015 in Japanese Patent Application No. 2011-166594 (with English language translation).
Combined Taiwanese Office Action and Search Report issued Dec. 22, 2015 in Patent Application No. 101127126 (with English Translation).
Japanese Office Action issued Dec. 22, 2015 in Patent Application No. 2012-141108 (with English Translation).
Office Action issued Nov. 9, 2015 in European Patent Application No. 12 819 814.0.

* cited by examiner

*Primary Examiner* — Brieann R Fink
(74) *Attorney, Agent, or Firm* — Oblon, McClelland, Maier & Neustadt, L.L.P.

(57) ABSTRACT

A resin composition containing a specific cellulose-based resin and a specific fumaric acid diester polymer in a specific blending ratio or containing, as the resin component, a specific cellulose-based resin and a specific fumaric acid diester polymer in a specific blending ratio and containing the resin component and an additive having an aromatic hydrocarbon ring or the like in a specific blending ratio. An optical compensation film can be produced using the resin composition.

22 Claims, No Drawings

RESIN COMPOSITION, OPTICAL COMPENSATION FILM USING THE SAME AND PRODUCTION METHOD OF OPTICAL COMPENSATION FILM

CROSS-REFERENCE TO RELATED APPLICATIONS

This application is National Stage of PCT/JP2012/068987 filed on Jul. 26, 2012. This application is based upon and claims the benefit of priority to Japanese Application No. 2011-166594 filed on Jul. 29, 2011, and to Japanese Application No. 2012-141108 filed on Jun. 22, 2012, the entirety of which is incorporated herein by reference.

BACKGROUND OF THE INVENTION

1. Technical Field

The present invention relates to a resin composition and an optical compensation film using the same. More specifically, the present invention relates to a resin composition and an optical compensation film for a liquid crystal display, which is excellent in the retardation characteristics.

2. Background Art

A liquid crystal display is being widely used as a most important display device in the multimedia society, including applications from a cellular phone to a computer monitor, a laptop computer and a television set. In a liquid crystal display, many optical films are used so as to enhance display characteristics. Among others, an optical compensation film plays a great role in, for example, improving the contrast or compensating the color tone when the display is viewed from the front or oblique direction.

The liquid crystal display includes many systems such as vertical alignment type (VA-LCD), in-plane switching liquid crystal display (IPS-LCD), super twisted nematic liquid crystal display (STN-LCD), reflective liquid crystal display and transflective liquid-crystal display, and an optical compensation film corresponding to the display is required.

As the conventional optical compensation film, a stretched film of a cellulose-based resin, a polycarbonate, a cyclic polyolefin or the like is used. In particular, a film composed of a cellulose-based resin, such as triacetyl cellulose film, is being widely used because of its good adhesiveness to a polyvinyl alcohol that is a polarizer.

However, the optical compensation film composed of a cellulose-based resin has several problems. For example, although a cellulose-based resin film is processed into an optical compensation film having a retardation value corresponding to various displays by adjusting the stretching conditions, the three-dimensional refractive indices of a film obtained by uniaxially or biaxially stretching a cellulose-based resin are ny≥nx>nz and in order to produce an optical compensation film having other three-dimensional refractive indices, for example, three-dimensional indices of ny>nz>nx or ny=nz>nx, a special stretching method of, for example, adhering a heat-shrinkable film to one surface or both surfaces of the film and heating/stretching the laminate to apply a shrinking force to the thickness direction of the polymer film is required, making it difficult to control the refractive index (retardation value) (see, for example, Patent Documents 1 to 3). Here, nx indicates the refractive index in the fast axis direction (the direction having a minimum refractive index) in the film plane, ny indicates the refractive index in the slow axis direction (the direction having a maximum refractive index) in the film plane, and nz indicates the refractive index in the out-of-film plane direction (thickness direction).

Also, although a cellulose-based resin film is generally produced by a solvent casting method, the cellulose-based resin film deposited by a casting method has an out-of-plane retardation (Rth) of about 40 nm in the film thickness direction and therefore, there is a problem that a color shift may occur, for example, in an IPS-mode liquid crystal display. Here, the out-of-plane retardation (Rth) is a retardation value represented by the following formula:

$$Rth=[(nx+ny)/2-nz]\times d$$

(wherein nx represents the refractive index in the fast axis direction in the film plane, ny represents the refractive index in the slow axis direction in the film plane, nz represents the refractive index in the out-of-film plane direction, and d represents the film thickness).

Furthermore, a retardation film composed of a fumaric acid ester-based resin has been proposed (see, for example, Patent Document 4).

However, the three-dimensional indices of a stretched film composed of a fumaric acid ester-based resin are nz>ny>nx, and lamination to another optical compensation film or the like is necessary for obtaining an optical compensation film exhibiting the above-described three-dimensional refractive indices.

BACKGROUND ART DOCUMENT

Patent Document

Patent Document 1: JP-A-2818983 (the term "JP-A" as used herein means an "unexamined published Japanese patent application")
Patent Document 2: JP-A-5-297223
Patent Document 3: JP-A-5-323120
Patent Document 4: JP-A-2008-64827

SUMMARY OF INVENTION

Problem that Invention is to Solve

The present invention has been made by taking into account those problems, and an object of the present invention is to provide a resin composition suitable for an optical compensation film, and an optical compensation film excellent in the retardation characteristics using the resin composition.

Means for Solving Problem

As a result of intensive studies to solve those problems, the present inventors have found that the above-described object can be attained by 1) a resin composition containing a cellulose-based resin and a fumaric acid diester polymer, 2) a resin composition containing a cellulose-based resin, a fumaric acid diester polymer and an additive having an aromatic hydrocarbon ring or aromatic heterocyclic ring, an optical compensation film using such a resin composition, and a production method thereof. The present invention has been accomplished based on this finding. That is, the present invention is 1) a resin composition comprising from 10 to 99 wt % of a cellulose-based resin represented by a predetermined formula and from 90 to 1 wt % of a fumaric acid diester polymer containing 60 mol % or more of a fumaric acid diester residue unit represented by a predetermined formula, 2) a resin composition comprising, as the resin component, from 10 to 99 wt % of a cellulose-based resin represented by a predetermined formula and from 99 to 1 wt % of a fumaric acid diester polymer containing 60 mol % or more of a fumaric acid diester residue unit represented by a predetermined formula, and further comprising from 70 to 99.99 wt % of the resin component and from 0.01 to 30 wt % of an additive containing an aromatic hydrocarbon ring or aromatic heterocyclic ring, an optical compensation film using such a resin composition, and a production method thereof.

The present invention is described in detail below.

The resin composition of the present invention contains from 10 to 99 wt % of a cellulose-based resin represented by the following formula (1) and from 90 to 1 wt % of a fumaric acid diester polymer containing 60 mol % or more of a fumaric acid diester residue unit represented by the following formula (2):

[Chem. 1]

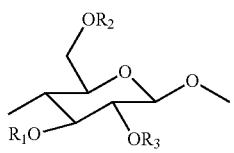

(1)

(wherein each of $R_1$, $R_2$ and $R_3$ independently represents hydrogen or an acyl group having a carbon number of 1 to 12); and

[Chem. 2]

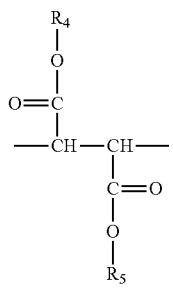

(2)

(wherein each of $R_4$ and $R_5$ independently represents an alkyl group having a carbon number of 1 to 12).

The cellulose-based resin contained in the resin composition of the present invention is a polymer obtained by linearly polymerizing β-glucose units and is a polymer in which hydroxyl groups at the 2-position, 3-position and 6-position of the glucose unit are partially or entirely esterified with an acyl group. Examples thereof include cellulose acetate, cellulose propionate, cellulose butyrate, and cellulose acetate butyrate.

The acylation degree means a ratio at which the hydroxyl group of cellulose is esterified (in the case of 100% esterification, the substitution degree is 1) on each of the 2-position, 3-position and 6-position, and the total degree of substitution DS by an acyl group is preferably 1.5≤DS≤3.0, more preferably from 1.8 to 2.8. The cellulose-based resin preferably has, as a substituent, an acyl group having a carbon number of 2 to 12. Examples of the acyl group having a carbon number of 2 to 12 include an acetyl group, a propionyl group, a butyryl group, a heptanoyl group, a hexanoyl group, an octanoyl group, a decanoyl group, a dodecanoyl group, an isobutanoyl group, a tert-butyryl group, a cyclohexanecarbonyl group, a benzoyl group, a naphthylcarbonyl group, and a cinnamoyl group. Among these, an acetyl group, a propionyl group and a butyryl group, which are an acyl group having a carbon number of 2 to 5, are preferred. As for the acyl group in the cellulose-based resin for use in the present invention, only one kind of an acyl group may be used, or two or more kinds of acyl groups may be used. In the case of using two or more kinds of acyl groups, one of those acyl groups is preferably an acetyl group.

At the acylation of the cellulose-based resin, in the case of using an acid anhydride or an acid chloride as the acylating agent, an organic acid, for example, acetyl acid or methylene chloride, is used as the organic solvent that is a reaction solvent. As for the catalyst, in the case where the acylating agent is an acid anhydride, a protonic catalyst such as sulfuric acid is preferably used, and in the case where the acylating agent is an acid chloride (for example, $CH_3CH_2COCl$), a basic compound is preferably used. A most commonly employed industrial synthesis method for a mixed fatty acid ester of cellulose is a method of acylating cellulose with a mixed organic acid component containing fatty acids (e.g., acetic acid, propionic acid, valeric acid) corresponding to an acetyl group and another acyl group or acid anhydrides thereof.

In the cellulose-based resin, the number average molecular weight (Mn) as determined in terms of standard polystyrene from an elution curve obtained by gel permeation chromatography (GPC) measurement is preferably from $1 \times 10^3$ to $1 \times 10^6$, and in view of excellent mechanical properties and excellent moldability at the time of film formation, more preferably from $1 \times 10^4$ to $2 \times 10^5$.

The fumaric acid diester polymer contained in the resin composition of the present invention (hereinafter, referred to as fumaric acid diester polymer) is a polymer containing 60 mol % or more of a fumaric acid diester residue unit represented by formula (2) and preferably contains 75 mol % or more of a fumaric acid diester residue unit represented by formula (2). Examples of the fumaric acid diester polymer include a diisopropyl fumarate polymer, a dicyclohexyl fumarate polymer, and a diisopropyl fumarate.diethyl fumarate copolymer. If the content of the fumaric acid diester residue unit represented by formula (2) is less than 60 mol %, the retardation developability is reduced. Each of $R_4$ and $R_5$ as ester substituents of the fumaric acid diester residue unit is an alkyl group having a carbon number of 1 to 12, and examples thereof include a methyl group, an ethyl group, a propyl group, an isopropyl group, an s-butyl group, a tert-butyl group, an s-pentyl group, a tert-pentyl group, an s-hexyl group, a tert-hexyl group, a 2-ethylhexyl group, a cyclopropyl group, a cyclopentyl group, and a cyclohexyl group. Examples of the fumaric acid diester residue unit represented by formula (2) include a dimethyl fumarate residue, a diethyl fumarate residue, a di-n-propyl fumarate residue, a diisopropyl fumarate residue, a di-n-butyl fumarate residue, a di-s-butyl fumarate, residue, a di-tert-butyl fumarate residue, a di-n-pentyl fumarate residue, a di-s-pentyl fumarate residue, a di-tert-pentyl fumarate residue, a di-n-hexyl fumarate residue, a di-s-hexyl fumarate residue, a di-tert-hexyl fumarate residue, a di-2-ethylhexyl fumarate, a dicyclopropyl fumarate residue, a dicyclopenyl fumarate residue, and a dicyclohexyl fumarate residue. Among these, a diisopropyl fumarate residue is preferred. The fumaric acid diester polymer is preferably a copolymer containing from 60 to 95 mol % of a diisopropyl fumarate residue unit and from 5 to 40 mol % of a fumaric acid diester residue unit selected from a diethyl fumarate residue unit, a di-n-propyl fumarate residue unit, a di-n-butyl fumarate residue unit and di-2-ethylhexyl fumarate residue unit.

In the fumaric acid diester polymer, the content of the fumaric acid diester residue unit represented by formula (2) is 60 mol % or more. It is preferred to contain 40 mol % or less of a residue unit of a monomer copolymerizable with fumaric acid diesters, and more preferably, the content of the fumaric acid diester residue unit is 75 mol % or more. The residue unit of a monomer copolymerizable with fumaric acid diesters includes, for example, one member or two or more members of a residue of styrenes such as styrene residue and α-methylstyrene residue; an acrylic acid residue; a residue of acrylic acid esters, such as methyl acrylate residue, ethyl acrylate residue and butyl acrylate residue; a methacrylic acid residue; a residue of methacrylic acid esters, such as methyl methacrylate residue, ethyl methacrylate residue and butyl methacrylate residue; a residue of vinyl esters, such as vinyl acetate residue and vinyl propionate residue; an acrylonitrile residue; a methacrylonitrile residue; a residue of olefins, such as ethylene residue and propylene residue; a vinylpyrrolidone residue; and a vinylpyridine residue.

In the fumaric acid diester polymer, the number average molecular weight (Mn) as determined in terms of standard polystyrene from an elution curve obtained by gel permeation chromatography (GPC) measurement is preferably from $1\times10^3$ to $5\times10^6$, and among others, in view of excellent mechanical properties and excellent moldability at the time of film formation, more preferably from $1\times10^4$ to $2\times10^5$.

As for the compositional ratio of the cellulose-based resin and the fumaric acid diester polymer in the resin composition of the present invention, the cellulose-based resin is from 10 to 99 wt % and the fumaric acid diester polymer is from 90 to 1 wt %. If the cellulose-based resin is less than 10 wt % (if the fumaric acid diester polymer exceeds 90 wt %) or if the cellulose-based resin exceeds 99 wt % (if the fumaric acid diester polymer is less than 1 wt %), the retardation can be hardly controlled. Preferably, the cellulose-based resin is from 30 to 90 wt % and the fumaric acid diester polymer is from 70 to 10 wt %; and more preferably, the cellulose-based resin is from 50 to 90 wt % and the fumaric acid diester polymer is from 50 to 10 wt %.

As for the production method of the fumaric acid diester polymer, the polymer may be produced by any method as long as the fumaric acid diester polymer is obtained, and, for example, the fumaric acid diester polymer can be produced by performing radical polymerization of fumaric acid diesters and using, depending on the case, a monomer copolymerizable with fumaric acid diesters in combination. Examples of the fumaric acid diesters include dimethyl fumarate, diethyl fumarate, di-n-propyl fumarate, diisopropyl fumarate, di-n-butyl fumarate, di-s-butyl fumarate, di-tert-butyl fumarate, di-s-pentyl fumarate, di-tert-pentyl fumarate, di-s-hexyl fumarate, di-tert-hexyl fumarate, di-2-ethylhexyl fumarate, dicyclopropyl fumarate, dicyclopentyl fumarate, and dicyclohexyl fumarate. The monomer copolymerizable with the fumaric acid diester includes, for example, one member or two or more members of styrenes such as styrene and α-methylstyrene; an acrylic acid; acrylic acid esters such as methyl acrylate, ethyl acrylate and butyl acrylate; a methacrylic acid; methacrylic acid esters such as methyl methacrylate, ethyl methacrylate and butyl methacrylate; vinyl esters such as vinyl acetate and vinyl propionate; acrylonitrile; methacrylonitrile; olefins such as ethylene and propylene; vinylpyrrolidone; and vinylpyridine.

As the method for radical polymerization, for example, any of a bulk polymerization method, a solution polymerization method, a suspension polymerization method, a precipitation polymerization method, and an emulsion polymerization method can be employed.

At the time of performing radical polymerization, examples of the polymerization initiator include an organic peroxide such as benzoyl peroxide, lauryl peroxide, octanoyl peroxide, acetyl peroxide, di-tert-butyl peroxide, tert-butyl cumyl peroxide and dicumyl peroxide; and an azo-based initiator such as 2,2'-azobis(2,4-dimethylvaleronitrile), 2,2'-azobis(2-butyronitrile), 2,2'-azobisisobutyronitrile, dimethyl 2,2'-azobisisobutyrate and 1,1'-azobis(cyclohexane-1-carbonitrile).

The solvent usable in the solution polymerization method or precipitation polymerization method is not particularly limited, and examples thereof include an aromatic solvent such as benzene, toluene and xylene; an alcohol-based solvent such as methanol, ethanol, propyl alcohol and butyl alcohol; cyclohexane; dioxane; tetrahydrofuran; acetone; methyl ethyl ketone; dimethyl formamide; and isopropyl acetate; and further include a mixed solvent thereof.

The polymerization temperature at the time of performing the radical polymerization can be appropriately set according to the decomposition temperature of the polymerization initiator, and in general, it is preferred to perform the polymerization at a temperature of 30 to 150° C.

In order to obtain more excellent optical characteristics, the resin composition of the present invention preferably contains an additive having an aromatic hydrocarbon ring or aromatic heterocyclic ring, in addition to the above-described cellulose-based resin and fumaric acid diester polymer.

In this case, the resin composition of the present invention contains, as the resin component, from 10 to 99 wt % of a cellulose-based resin represented by the following formula (1) and from 90 to 1 wt % of a fumaric acid diester polymer containing 60 mol % or more of a fumaric acid diester residue unit represented by the following formula (2), and further contains from 70 to 99.99 wt % of the resin component and from 0.01 to 30 wt % of an additive containing an aromatic hydrocarbon ring or aromatic heterocyclic ring:

[Chem. 3]

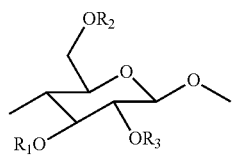

(1)

(wherein each of $R_1$, $R_2$ and $R_3$ independently represents hydrogen or an acyl group having a carbon number of 1 to 12); and

[Chem. 4]

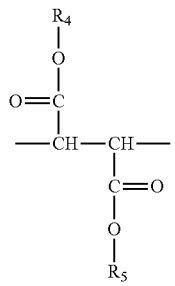

(2)

(wherein each of $R_4$ and $R_5$ independently represents an alkyl group having a carbon number of 1 to 12).

In this case, as for the compositional ratio of the cellulose-based resin and the fumaric acid diester polymer in the resin composition of the present invention, the cellulose-based resin is from 10 to 99 wt % and the fumaric acid diester polymer is from 90 to 1 wt %. If the cellulose-based resin is less than 10 wt % (if the fumaric acid diester polymer exceeds 90 wt %) or if the cellulose-based resin exceeds 99 wt % (if the fumaric acid diester polymer is less than 1 wt %), the retardation can be hardly controlled. Preferably, the cellulose-based resin is from 30 to 97 wt % and the fumaric acid diester polymer is from 70 to 3 wt %; and more preferably, the cellulose-based resin is from 50 to 95 wt % and the fumaric acid diester polymer is from 50 to 5 wt %.

The additive having an aromatic hydrocarbon ring or aromatic heterocyclic ring, which is contained in the resin composition of the present invention, is not particularly limited in the birefringence $\Delta n$ represented by the following formula (1), but because of providing for an optical compensation film excellent in the optical characteristics, the birefringence is preferably 0.05 or more, more preferably from 0.05 to 0.5, still more preferably from 0.1 to 0.5. The $\Delta n$ of the additive can be determined by a molecular orbital calculation.

$$\Delta n = ny - nx \quad (1)$$

(wherein nx represents the refractive index in the fast axis direction of the additive molecule and ny represents the refractive index in the slow axis direction of the additive molecule).

The additive having an aromatic hydrocarbon ring or aromatic heterocyclic ring in the resin composition of the present invention is not particularly limited in the number of aromatic hydrocarbon rings or aromatic heterocyclic rings in the molecule, but because of providing for an optical compensation film excellent in the optical characteristics, the number of such rings is preferably from 1 to 12, more preferably from 1 to 8. The aromatic hydrocarbon ring includes, for example, a 5-membered ring, a 6-membered ring, a 7-membered ring, and a condensed ring composed of two or more aromatic rings, and the aromatic heterocyclic ring includes, for example, a furan ring, a thiophene ring, a pyrrole ring, an oxazole ring, a thiazole ring, an imidazole ring, a triazole ring, a pyridine ring, a pyrimidine ring, a pyrazine ring, and a 1,3,5-triazine ring.

The aromatic hydrocarbon ring or aromatic heterocyclic ring may have a substituent, and examples of the substituent include a hydroxyl group, an ether group, a carbonyl group, an ester group, a carboxylic acid residue, an amino group, an imino group, an amido group, an imido group, a cyano group, a nitro group, a sulfonyl group, a sulfonic acid residue, a phosphonyl group, and a phosphonic acid residue.

Examples of the additive having an aromatic hydrocarbon ring or aromatic heterocyclic ring, which is used in the present invention, include a phosphoric acid ester-based compound such as tricresyl phosphate, trixylenyl phosphate, triphenyl phosphate, 2-ethylhexyldiphenyl phosphate, cresyldiphenyl phosphate and bisphenol A bis(diphenyl phosphate), a phthalic acid ester-based compound such as dimethyl phthalate, diethyl phthalate, dibutyl phthalate, dihexyl phthalate, di-normal-octyl phthalate, 2-ethylhexyl phthalate, diisooctyl phthalate, dicapryl phthalate, dinonyl phthalate, diisononyl phthalate, didecyl phthalate and diisodecyl phthalate, a trimellitic acid ester-based compound such as tributyl trimellitate, tri-normal-hexyl trimellitate, tri(2-ethylhexyl)trimellitate, tri-normal-octyl trimellitate, tri-isooctyl trimellitate and tri-isodecyl trimellitate, a pyromellitic acid ester-based compound such as tri(2-ethylhexyl)pyromellitate, tetrabutyl pyromellitate, tetra-normal-hexyl pyromellitate, tetra(2-ethylhexyl)pyromellitate, tetra-normal-octyl pyromellitate, tetra-isooctyl pyromellitate and tetra-isodecyl pyromellitate, a benzoic acid ester-based compound such as ethyl benzoate, isopropyl benzoate and ethyl paraoxybenzoate, a salicylic acid ester-based compound such as phenyl salicylate, p-octylphenyl salicylate and p-tert-butylphenyl salicylate, a glycolic acid ester-based compound such as methyl phthalyl ethyl glycolate, ethyl phthalyl ethyl glycolate and butyl phthalyl butyl glycolate, a benzotriazole-based compound such as 2-(2'-hydroxy-5'-tert-butylphenyl)benzotriazole and 2-(2'-hydroxy-3',5'-di-tert-butylphenyl)benzotriazole, a benzophenone-based compound such as 2-hydroxy-4-methoxybenzophenone, 2,2'-dihydroxy-4-methoxybenzophenone, 2,4-dihydroxybenzophenone and 2-hydroxy-4-methoxy-5-sulfobenzophenone, a sulfonamide-based compound such as N-benzenesulfonamide, and a triazine-based compound such as 2,4-diphenyl-6-(2-hydroxy-4-methoxyphenyl)-1,3,5-triazine, 2,4-diphenyl-6-(2-hydroxy-4-ethoxyphenyl)-1,3,5-triazine, 2,4-diphenyl-(2-hydroxy-4-propoxyphenyl)-1,3,5-triazine and 2,4-diphenyl-(2-hydroxy-4-butoxyphenyl)-1,3,5-triazine. Preferred examples include tricresyl phosphate, 2-ethylhexyldiphenyl phosphate and 2-hydroxy-4-methoxybenzophenone. One of these may be used or two or more thereof may be used in combination.

The proportion of the additive having an aromatic hydrocarbon ring or aromatic heterocyclic ring in the resin composition of the present invention is from 0.01 to 30 wt % (the resin component above: from 70 to 99.99 wt %), preferably from 0.5 to 20 wt %, more preferably from 1 to 15 wt %. If the proportion is less than 0.01 wt %, the enhancement efficiency of optical characteristics is low, whereas if the proportion exceeds 30 wt %, the mechanical properties may be poor.

The resin composition of the present invention may contain an antioxidant so as to enhance the thermal stability. Examples of the antioxidant include a hindered phenol-based antioxidant, a phosphorus-based antioxidant, a sulfur-based antioxidant, a lactone-based antioxidant, an amine-based antioxidant, a hydroxylamine-based antioxidant, a vitamin E-based antioxidant, and other antioxidants. One of these antioxidant may be used alone, or two or more thereof may be used.

The resin composition of the present invention may contain a hindered amine-based light stabilizer or an ultraviolet absorber. Examples of the ultraviolet absorber include benzotriazole, benzophenone, triazine, and benzoate.

The resin composition of the present invention may contain other polymers, a surfactant, a polymer electrolyte, an electroconductive complex, a pigment, a dye, an antistatic agent, an antiblocking agent, a lubricant and the like, as long as the gist of the invention is observed.

The resin composition of the present invention can be obtained by blending a cellulose-based resin and a fumaric acid diester polymer or blending a cellulose-based resin, a fumaric acid diester polymer and an additive having an aromatic hydrocarbon ring or aromatic heterocyclic ring.

The blending method which can be used includes a melt blending method, a solution blending method, and the like. The melt blending method is a method where the resins or the resins and the additive having an aromatic hydrocarbon ring or aromatic heterocyclic ring are melted by heating and kneaded. The solution blending method is a method where the resins or the resins and the additive having an aromatic hydrocarbon ring or aromatic heterocyclic ring are dissolved in a solvent and blended. Examples of the solvent which can be used for the solution blending include a chlorine-based solvent such as methylene chloride and chloroform, an aromatic solvent such as toluene and xylene, acetone, methyl ethyl ketone, methyl isobutyl ketone, an alcohol solvent such as methanol, ethanol and propanol, dimethylformamide, and N-methylpyrrolidone. It is also possible to dissolve each resin or dissolve each resin and the additive having an aromatic hydrocarbon ring or aromatic heterocyclic ring in a solvent and thereafter, blend the solutions. Furthermore, it is also possible that powders, pellets or the like of respective resins are kneaded and then dissolved in a solvent. The obtained blend resin solution may be charged into a poor solvent to precipitate the resin composition, or the blend resin solution may be directly used for the production of an optical compensation film.

At the time of blending, the ratio of the cellulose-based resin and the fumaric acid diester polymer is from 10 to 99 wt %:from 90 to 1 wt %. Also, as for the ratio of the cellulose-based resin, the fumaric acid diester polymer and the additive having an aromatic hydrocarbon ring or aromatic heterocyclic ring, the ratio of cellulose-based resin:fumaric acid diester polymer is from 10 to 99 wt %:from 90 to 1 wt %, and the ratio of resin component (cellulose-based resin and fumaric acid diester polymer):additive having an aromatic hydrocarbon ring or aromatic heterocyclic ring is from 70 to 99.99 wt %:from 0.01 to 30 wt %. If the ratio of the additive deviates from this range, the retardation is sometimes difficult to control.

The optical compensation film using the resin composition of the present invention preferably has a thickness of 5 to 200 µm, more preferably from 10 to 100 µm, still more preferably from 30 to 80 µm. In the case of an optical compensation film using the resin composition of the present invention containing an additive having an aromatic hydrocarbon ring or aromatic heterocyclic ring, the thickness is from 5 to 200 µm, preferably from 10 to 100 µm, still more preferably from 30 to 80 µm, yet still more preferably from 30 to 75 µm. In the case where the resin composition contains an additive having an aromatic hydrocarbon ring or aromatic heterocyclic ring, if the thickness is less than 5 µm, the film may be difficult to handle, whereas if the thickness exceeds 200 µm, reduction in the thickness of an optical member may not be achieved.

The retardation characteristics of the optical compensation film using the resin composition of the present invention vary depending on the intended optical compensation film, and 1) the in-plane retardation (Re) represented by the following formula (2) is preferably from 80 to 300 nm, more preferably from 100 to 300 nm, still more preferably from 200 to 280 nm, and the Nz coefficient represented by the following formula (3) is preferably from 0.35 to 0.65, more preferably from 0.45 to 0.55; 2) the in-plane retardation (Re) is preferably from 50 to 200 nm, more preferably from 80 to 160 nm, and the Nz coefficient is preferably from −0.2 to 0.2, more preferably from −0.1 to 0.1; or 3) the in-plane retardation (Re) is preferably from 0 to 20 nm, more preferably from 0 to 5 nm, and the out-of-plane retardation (Rth) represented by the following formula (4) is preferably from −150 to 10 nm, more preferably from −120 to 0 nm. Measurement was performed using a full-automatic birefringence analyzer (trade name: KOBRA-21ADH, manufactured by Oji Scientific Instruments) under the condition of a measurement wavelength of 589 nm.

These retardation characteristics are difficult to develop in an optical compensation film using the conventional cellulose-based resin.

$$Re=(ny-nx) \times d \quad (2)$$

$$Nz=(ny-nz)/(ny-nx) \quad (3)$$

$$Rth=[(nx+ny)/2-nz] \times d \quad (4)$$

(wherein nx represents the refractive index in the fast axis direction in the film plane, ny represents the refractive index in the slow axis direction in the film plane, nz represents the refractive index in the out-of-film plane direction, and d represents the film thickness).

In the optical compensation film of the present invention, for enhancing the luminance, the light transmittance is preferably 85% or more, more preferably 90% or more.

In the optical compensation film of the present invention, for enhancing the contrast, the haze is preferably 2% or less, more preferably 1% or less.

As for the production method of the optical compensation film using the resin composition of the present invention, any method may be used as long as the optical compensation film of the present invention can be produced, but the optical compensation film is preferably produced by a solution casting method, because an optical compensation film excellent in the optical characteristics, heat resistance, surface characteristics and the like is obtained. Here, the solution casting method is a method of casting a resin solution (generally called a dope) on a supporting substrate and evaporating the solvent by heating to obtain an optical compensation film. As the method for casting, for example, a T-die method, a doctor blade method, a bar coater method, a roll coater method, and a lip coater method are used, and in industry, a method of continuously extruding a dope from a die on a belt-shaped or drum-shaped supporting substrate is most commonly used. The supporting substrate used includes, for example, a glass substrate, a metal substrate such as stainless steel and ferrotype, and a plastic substrate such as polyethylene terephthalate. In order to industrially produce a substrate highly excellent in the surface property and optical homogeneity by continuous film formation, a metal substrate with the surface being mirror-finished is preferably used. At the time of producing an optical compensation film excellent in the thickness precision and surface smoothness, the viscosity of the resin solution is a very important factor, and the viscosity of the resin solution depends on the concentration or molecular weight of the resin or the kind of the solvent. The resin solution in producing the optical compensation film using the resin composition of the present invention is prepared by dissolving the cellulose-based resin and the fumaric acid diester polymer in a solvent. The viscosity of the resin solution can be adjusted by the molecular weight of the polymer, the concentration of the polymer, or the kind of the solvent. The viscosity of the resin solution is not particularly limited but in order to more facilitate coating the film, the viscosity is preferably from 100 to 10,000 cps, more preferably from 300 to 5,000 cps, still more preferably from 500 to 3,000 cps.

The production method of the optical compensation film using the resin composition of the present invention includes, for example, dissolving from 10 to 99 wt % of a cellulose-based resin represented by the following formula (1) and from 90 to 1 wt % of a fumaric acid diester polymer containing 60 mol % or more of a fumaric acid diester residue unit represented by the following formula (2) in a solvent, casting the obtained resin solution on a base material and after drying, separating the resulting film from the base material:

[Chem. 5]

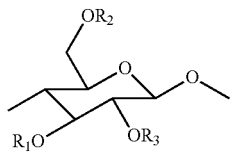

(1)

(wherein each of $R_1$, $R_2$ and $R_3$ independently represents hydrogen or an acyl group having a carbon number of 1 to 12); and

[Chem. 6]

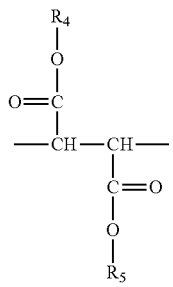

(2)

(wherein each of $R_4$ and $R_5$ independently represents an alkyl group having a carbon number of 1 to 12).

The optical compensation film obtained using the resin composition of the present invention is preferably stretched at least in a uniaxial direction so as to develop the in-plane retardation (Re). The stretching is preferably performed at 50 to 200° C., more preferably from 100 to 160° C. The stretch ratio is preferably from 1.05 to 3 times, more preferably from 1.1 to 2.0 times. The in-plane retardation (Re) can be controlled by the stretching temperature and the stretch ratio.

In the case where the resin composition of the present invention contains the additive having an aromatic hydrocarbon ring or aromatic heterocyclic ring, the production method of the optical compensation film using the resin composition includes, for example, dissolving, as the resin component, from 10 to 99 wt % of a cellulose-based resin represented by the following formula (1) and from 90 to 1 wt % of a fumaric acid diester polymer containing 60 mol % or more of a fumaric acid diester residue unit represented by the following formula (2), and further dissolving from 70 to 99.99 wt % of the resin component and from 0.01 to 30 wt % of an additive containing an aromatic hydrocarbon ring or aromatic heterocyclic ring, in a solvent, casting the obtained resin solution on a base material and after drying, separating the resulting film from the base material:

[Chem. 7]

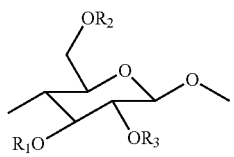

(1)

(wherein each of $R_1$, $R_2$ and $R_3$ independently represents hydrogen or an acyl group having a carbon number of 1 to 12); and

[Chem. 8]

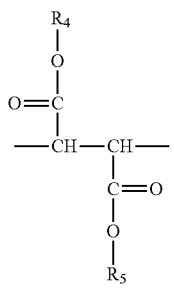

(2)

(wherein each of $R_4$ and $R_5$ independently represents an alkyl group having a carbon number of 1 to 12).

In the case where the resin composition of the present invention contains the additive having an aromatic hydrocarbon ring or aromatic heterocyclic ring, the optical compensation film obtained using the resin composition of the present invention is preferably uniaxially stretched or unbalanced biaxially stretched so as to develop the in-plane retardation (Re). As the method for stretching the optical compensation film, for example, a longitudinal uniaxial stretching method by roll stretching, a transverse uniaxial stretching method by tenter stretching, and a combination thereof, that is, an unbalanced sequential biaxial stretching method or an unbalanced simultaneous biaxial stretching method, may be used. Also, in the present invention, the retardation characteristics can be caused to develop without using a special stretching method of performing the stretching under the action of a shrinking force of a heat-shrinkable film.

In the case where the resin composition of the present invention contains the additive having an aromatic hydrocarbon ring or aromatic heterocyclic ring, the thickness of the optical compensation film in stretching is from 40 to 200 µm, preferably from 50 to 180 µm, more preferably from 60 to 160 µm. If the thickness is less than 40 µm, the stretching may become difficult, whereas if the thickness exceeds 200 µm, reduction in the thickness of an optical member may not be achieved.

The stretching temperature is not particularly limited but is preferably from 50 to 200° C., more preferably from 100 to 160° C., because good retardation characteristics are obtained. The stretch ratio in uniaxial stretching is not particularly limited but is preferably from 1.05 to 3 times, more preferably from 1.1 to 2.0 times, because good retardation characteristics are obtained. The stretch ratio in unbalanced biaxial stretching is not particularly limited, but the stretch ratio in the length direction is preferably from 1.05 to 3 times, more preferably from 1.1 to 2.0 times, because an optical compensation film excellent in the optical characteristics is obtained, and the stretch ratio in the width direction is preferably from 1.01 to 1.2 times, more preferably from 1.05 to 1.1 times, because an optical compensation film excellent in the optical characteristics is obtained. The in-plane retardation (Re) can be controlled by the stretching temperature or the stretch ratio.

The optical compensation film using the resin composition of the present invention can be laminated, if desired, to a film containing other resins. Other resins include, for example, polyethersulfone, polyarylate, polyethylene terephthalate, polynaphthalene terephthalate, polycarbonate, cyclic polyolefin, a maleimide-based resin, a fluororesin, and polyimide. It is also possible to stack a hardcoat layer or a gas barrier layer.

Effects of Invention

The optical compensation film using the resin composition of the present invention exhibits specific retardation characteristics and therefore, is useful as an optical compensation film or an antireflection film for liquid crystal displays.

EXAMPLES

The present invention is described below by referring to Examples, but the present invention is not limited to these Examples.

Incidentally, various physical properties indicated in Examples were measured by the following methods.
<Analysis of Polymer>
The structural analysis of the polymer was performed using a nuclear magnetic resonance analyzer (trade name: JNM-GX270, manufactured by JEOL Ltd.), and the structure was determined by proton nuclear magnetic resonance spectroscopy ($^1$H-NMR) spectral analysis.
<Measurement of Number Average Molecular Weight>
Using a gel permeation chromatograph (GPC) (C0-8011 (equipped with column $GMH_{HR}$-H), trade name; manufactured by Tosoh Corp.) and using tetrahydrofuran or dimethylformamide as a solvent, the molecular weight was measured at 40° C. and determined as a value in terms of standard polystyrene.
<Measurements of Light Transmittance and Haze of Optical Compensation Film>
The light transmittance and haze of the film produced were measured using a haze meter (trade name: NDH2000, manufactured by Nippon Denshoku Industries Co., Ltd.), and the light transmittance and the haze were measured in accordance with JIS K 7361-1 (1997) and JIS-K 7136 (2000), respectively.
<Measurement of Retardation Characteristics>
The retardation characteristics of the optical compensation film were measured using a sample inclination-type automatic birefringence analyzer (trade name: KOBRA-WR, manufactured by Oji Scientific Instruments) and using light at a wavelength of 589 nm.

Synthesis Example 1

Into a 5-L autoclave, 2,400 g of distilled water containing 0.2 wt % of hydroxypropylmethylcellulose, 1,388 g of diisopropyl fumarate, 212 g of diethyl fumarate and 12.7 g of a polymerization initiator (trade name: Perbutyl PV, produced by NOF Corporation) were charged, and suspension radical polymerization reaction was performed under the conditions of a polymerization temperature of 48° C. and a polymerization time of 30 hours. The polymer particle obtained was collected by filtration, thoroughly washed with water and methanol and then dried at 80° C. to obtain a diisopropyl fumarate.diethyl fumarate polymer. The number average molecular weight of the obtained diisopropyl fumarate.diethyl fumarate polymer was 98,000, the ratio of the diisopropyl fumarate unit was 83 mol %, and the ratio of the diethyl fumarate unit was 17 mol %.

Synthesis Example 2

Into a 1-L autoclave, 200 g of diisopropyl fumarate, 17 g of diethyl fumarate, 32 g of vinylpyrrolidone and 0.2 g of a polymerization initiator (trade name: Perbutyl PV, produced by NOF Corporation) were charged, and radical polymerization reaction was performed under the conditions of a polymerization temperature of 45° C. and a polymerization time of 8 hours. A solution containing the obtained polymer was charged into a large excess of methanol to precipitate a polymer. The polymer obtained was filtered and then dried at 80° C. to obtain a diisopropyl fumarate.diethyl fumarate.vinylpyrrolidone polymer. The number average molecular weight of the obtained polymer was 45,000, the ratio of the diisopropyl fumarate was 80 mol %, the ratio of the diethyl fumarate unit was 6 mol %, and the ratio of the polyvinylpyrrolidone unit was 14 mol %.

Synthesis Example 3

Into a 1-L autoclave, 480 g of distilled water containing 0.2 wt % of hydroxypropylmethylcellulose, 208 g of diisopropyl fumarate, 85 g of diethyl fumarate and 12.7 g of a polymerization initiator (trade name: Perbutyl PV, produced by NOF Corporation) were charged, and suspension radical polymerization reaction was performed under the conditions of a polymerization temperature of 48° C. and a polymerization time of 30 hours. The polymer particle obtained was collected by filtration, thoroughly washed with water and methanol and then dried at 80° C. to obtain a diisopropyl fumarate.diethyl fumarate polymer. The number average molecular weight of the obtained diisopropyl fumarate.diethyl fumarate polymer was 63,000, the ratio of the diisopropyl fumarate unit was 64 mol %, and the ratio of the diethyl fumarate unit was 36 mol %.

Synthesis Example 4

Into a 5-L autoclave, 2,600 g of distilled water containing 0.2 wt % of hydroxypropylmethylcellulose, 1,232 g of diisopropyl fumarate, 168 g of di-n-butyl fumarate and 11 g of a polymerization initiator (trade name: Perbutyl PV, produced by NOF Corporation) were charged, and suspension radical polymerization reaction was performed under the conditions of a polymerization temperature of 47° C. and a polymerization time of 36 hours. The polymer particle obtained was collected by filtration, thoroughly washed with water and methanol and then dried at 80° C. to obtain a diisopropyl fumarate.di-n-butyl fumarate polymer. The number average molecular weight of the obtained polymer was 88,000, the ratio of the diisopropyl fumarate unit was 88 mol %, and the ratio of the di-n-butyl fumarate unit was 12 mol %.

Synthesis Example 5

Into a 5-L autoclave, 2,600 g of distilled water containing 0.2 wt % of hydroxypropylmethylcellulose, 1,200 g of diisopropyl fumarate, 184 g of di-2-ethylhexyl fumarate and 11 g of a polymerization initiator (trade name: Perbutyl PV, produced by NOF Corporation) were charged, and suspension radical polymerization reaction was performed under the conditions of a polymerization temperature of 47° C. and a polymerization time of 36 hours. The polymer particle obtained was collected by filtration, thoroughly washed with water and methanol and then dried at 80° C. to obtain a diisopropyl fumarate.di-2-ethylhexyl fumarate polymer. The number average molecular weight of the obtained polymer was 85,000, the ratio of the diisopropyl fumarate unit was 92.5 mol %, and the ratio of the di-2-ethylhexyl fumarate unit was 7.5 mol %.

Example 1

261 g of cellulose acetate (acetyl group=82 mol %, total degree of substitution DS=2.46, number average molecular weight=30,000) and 39 g of the diisopropyl fumarate.diethyl fumarate polymer obtained in Synthesis Example 1 were dissolved in 1,700 g of methylene chloride to make a 15 wt % solution and then charged into a large amount of methanol to precipitate a solid. The obtained solid was filtered and dried to obtain 298 g of a resin composition. The obtained resin composition was a resin composition containing 87 wt % of cellulose acetate and 13 wt % of diisopropyl fumarate.diethyl fumarate polymer. 200 g of the obtained resin composition was dissolved in 800 g of methylene chloride, and the solution was cast on the support of a solution casting apparatus by a T-die method and dried in steps at a drying temperature of 30° C. and subsequently at 80° C. to obtain an optical compensation film (width: 150 mm, thickness: 80 μm).

The total light transmittance, haze and retardation characteristics of the optical compensation film obtained were measured, and the results thereof are shown in Table 1.

TABLE 1

|  | Light Transmittance (%) | Haze (%) | Re (nm) | Rth (nm) | Nz Coefficient |
|---|---|---|---|---|---|
| Example 1 | 90 | 0.9 | 0 | 0 | — |
| Example 2 | 92 | 0.5 | 0 | 0 | — |
| Example 3 | 91 | 0.8 | 1 | −2 | — |
| Example 4 | 91 | 0.6 | 125 | — | 0.5 |
| Example 5 | 91 | 0.7 | 268 | — | 0.5 |
| Example 6 | 91 | 0.8 | 124 | — | 0.4 |
| Example 7 | 91 | 0.8 | 135 | — | 0 |
| Comparative Example 1 | 90 | 0.5 | 0 | 52 | — |
| Comparative Example 2 | 91 | 0.7 | 2 | 41 | — |
| Comparative Example 3 | 91 | 0.6 | 1 | −305 | — |
| Comparative Example 4 | 90 | 0.7 | 298 | — | 1.2 |

The optical compensation film obtained exhibited high total light transmittance, revealing excellent transparency, was small in the haze and had optical characteristics of the in-plane retardation (Re) and the out-of-plane retardation in the thickness direction (Rth) being in the target ranges.

Example 2

283 g of cellulose acetate (acetyl group=82 mol %, total degree of substitution DS=2.46, number average molecular weight=30,000) and 50 g of the diisopropyl fumarate.diethyl fumarate.vinylpyrrolidone polymer obtained in Synthesis Example 2 were dissolved in 1,500 g of methylene chloride and then charged into a large amount of methanol to precipitate a solid. The obtained solid was filtered and dried to obtain 305 g of a resin composition. The obtained resin composition was a resin composition containing 85 wt % of cellulose acetate and 15 wt % of diisopropyl fumarate.diethyl fumarate.vinylpyrrolidone polymer. 200 g of the obtained resin composition was dissolved in 800 g of methylene chloride, and the solution was cast on the support of a solution casting apparatus by a T-die method and dried in steps at a drying temperature of 30° C. and subsequently at 80° C. to obtain an optical compensation film (width: 150 mm, thickness: 80 μm).

The total light transmittance, haze and retardation characteristics of the optical compensation film obtained were measured, and the results thereof are shown together in Table 1.

The optical compensation film obtained exhibited high total light transmittance, revealing excellent transparency, was small in the haze and had optical characteristics of the in-plane retardation (Re) and the out-of-plane retardation in the thickness direction (Rth) being in the target ranges.

Example 3

279 g of cellulose acetate propionate (acetyl group=7 mol %, propionyl group=80 mol %, total degree of substitution DS=2.6, number average molecular weight=25,000) and 21 g of the diisopropyl fumarate.diethyl fumarate polymer obtained in Synthesis Example 1 were dissolved in 1,700 g of tetrahydrofuran to make a 15 wt % solution and then charged into a large amount of methanol to precipitate a solid. The obtained solid was filtered and dried to obtain 295 g of a resin composition. The obtained resin composition was a resin composition containing 93 wt % of cellulose acetate propionate and 7 wt % of diisopropyl fumarate.diethyl fumarate polymer. 200 g of the obtained resin composition was dissolved in 800 g of methyl ethyl ketone, and the solution was cast on the support of a solution casting apparatus by a T-die method and dried in steps at a drying temperature of 30° C. and subsequently at 80° C. to obtain an optical compensation film (width: 150 mm, thickness: 77 μm).

The total light transmittance, haze and retardation characteristics of the optical compensation film obtained were measured, and the results thereof are shown together in Table 1.

The optical compensation film obtained exhibited high total light transmittance, revealing excellent transparency, was small in the haze and had optical characteristics of the in-plane retardation (Re) and the out-of-plane retardation in the thickness direction (Rth) being in the target ranges.

Example 4

210 g of cellulose acetate butyrate (acetyl group=5 mol %, butyryl group=82 mol %, total degree of substitution DS=2.6, number average molecular weight=43,000) and 90 g of the diisopropyl fumarate.diethyl fumarate polymer obtained in Synthesis Example 3 were dissolved in 1,700 g of methyl ethyl ketone to make a 15 wt % solution and then charged into a large amount of methanol to precipitate a solid. The obtained solid was filtered and dried to obtain 278 g of a resin composition. The obtained resin composition was a resin composition containing 70 wt % of cellulose acetate butyrate and 30 wt % of diisopropyl fumarate.diethyl fumarate polymer. 200 g of the obtained resin composition was dissolved in 800 g of methyl ethyl ketone, and the solution was cast on the support of a solution casting apparatus by a T-die method and dried in steps at a drying temperature of 30° C. and subsequently at 100° C. to obtain a film having a width of 150 mm and a thickness of 190 μm. The obtained film was cut into a 50-mm square and stretched at 145° C. to 1.3 times its length and 1.1 times its width to obtain an optical compensation film.

The total light transmittance, haze and retardation characteristics of the optical compensation film obtained were measured, and the results thereof are shown together in Table 1.

The optical compensation film obtained exhibited high total light transmittance, revealing excellent transparency, was small in the haze and had optical characteristics of the in-plane retardation (Re) and the Nz coefficient being in the target ranges.

Example 5

240 g of cellulose butyrate (butyryl group=87 mol %, total degree of substitution DS=2.6, number average molecular weight=30,000) and 60 g of the diisopropyl fumarate.diethyl fumarate.vinylpyrrolidone polymer obtained in Synthesis Example 2 were dissolved in 1,700 g of methyl ethyl ketone to make a 15 wt % solution and then charged into a large amount of methanol to precipitate a solid. The obtained solid was filtered and dried to obtain 278 g of a resin composition. The obtained resin composition was a resin composition containing 81 wt % of cellulose butyrate and 19 wt % of diisopropyl fumarate.diethyl fumarate.vinylpyrolidone polymer. 200 g of the obtained resin composition was dissolved in 800 g of methyl ethyl ketone, and the solution was cast on the support of a solution casting apparatus by a T-die method and dried in steps at a drying temperature of 30° C. and subsequently at 100° C. to obtain a film having a width of 150 mm and a thickness of 200 μm. The obtained film was cut into a 50-mm square and stretched at 150° C. to 1.5 times its length and 1.1 times its width to obtain an optical compensation film.

The total light transmittance, haze and retardation characteristics of the optical compensation film obtained were measured, and the results thereof are shown together in Table 1.

The optical compensation film obtained exhibited high total light transmittance, revealing excellent transparency, was small in the haze and had optical characteristics of the in-plane retardation (Re) and the Nz coefficient being in the target ranges.

Example 6

250 g of cellulose butyrate (butyryl group=91 mol %, total degree of substitution DS=2.7, number average molecular weight=35,000) and 50 g of the diisopropyl fumarate.di-n-butyl fumarate polymer obtained in Synthesis Example 4 were dissolved in 1,700 g of tetrahydrofuran to make a 15 wt % solution and then charged into a large amount of methanol to precipitate a solid. The obtained solid was filtered and dried to obtain 280 g of a resin composition. The obtained resin composition was a resin composition containing 83 wt % of cellulose butyrate and 17 wt % of diisopropyl fumarate.di-n-butyl fumarate polymer. 200 g of the obtained resin composition was dissolved in 800 g of tetrahydrofuran, and the solution was cast on the support of a solution casting apparatus by a T-die method and dried in steps at a drying temperature of 30° C. and subsequently at 100° C. to obtain a film having a width of 150 mm and a thickness of 200 μm. The obtained film was cut into a 50-mm square and stretched at 140° C. to 1.3 times its length and 1.0 times its width to obtain an optical compensation film.

The total light transmittance, haze and retardation characteristics of the optical compensation film obtained were measured, and the results thereof are shown together in Table 1.

The optical compensation film obtained exhibited high total light transmittance, revealing excellent transparency, was small in the haze and had optical characteristics of the in-plane retardation (Re) and the Nz coefficient being in the target ranges.

Example 7

100 g of cellulose butyrate (butyryl group=87 mol %, total degree of substitution DS=2.6, number average molecular weight=30,000) and 200 g of the diisopropyl fumarate.di-2-ethylhexyl fumarate polymer obtained in Synthesis Example 5 were dissolved in 1,700 g of methyl ethyl ketone to make a 15 wt % solution and then charged into a large amount of methanol to precipitate a solid. The obtained solid was filtered and dried to obtain 286 g of a resin composition. The obtained resin composition was a resin composition containing 32 wt % of cellulose butyrate and 68 wt % of diisopropyl fumarate.di-2-ethylhexyl fumarate polymer. 200 g of the obtained resin composition was dissolved in 800 g of methyl ethyl ketone, and the solution was cast on the support of a solution casting apparatus by a T-die method and dried in steps at a drying temperature of 30° C. and subsequently at 100° C. to obtain a film having a width of 150 mm and a thickness of 180 μm. The obtained film was cut into a 50-mm square and stretched at 150° C. to 1.25 times its length and 1.05 times its width to obtain an optical compensation film.

The total light transmittance, haze and retardation characteristics of the optical compensation film obtained were measured, and the results thereof are shown together in Table 1.

The optical compensation film obtained exhibited high total light transmittance, revealing excellent transparency, was small in the haze and had optical characteristics of the in-plane retardation (Re) and the Nz coefficient being in the target ranges.

Comparative Example 1

200 g of cellulose acetate used in Example 1 was dissolved in 800 g of methylene chloride, and the solution was cast on the support of a solution casting apparatus by a T-die method and dried in steps at a drying temperature of 30° C. and subsequently at 80° C. to obtain a film having a width of 150 mm and a thickness of 80 μm.

The total light transmittance, haze and retardation characteristics of the film obtained were measured, and the results thereof are shown together in Table 1.

The film obtained exhibited high total light transmittance, revealing excellent transparency, and was small in the haze but had a large out-of-plane retardation in the thickness direction (Rth) and failed in having the target optical characteristics.

Comparative Example 2

200 g of cellulose acetate propionate used in Example 3 was dissolved in 800 g of tetrahydrofuran, and the solution was cast on the support of a solution casting apparatus by a T-die method and dried in steps at a drying temperature of 30° C. and subsequently at 80° C. to obtain a film having a width of 150 mm and a thickness of 77 μm.

The total light transmittance, haze and retardation characteristics of the film obtained were measured, and the results thereof are shown together in Table 1.

The film obtained exhibited high total light transmittance, revealing excellent transparency, and was small in the haze but had a large out-of-plane retardation in the thickness direction (Rth) and failed in having the target optical characteristics.

Comparative Example 3

200 g of diisopropyl fumarte.diethyl fumarate polymer obtained in Synthesis Example 1 was dissolved in 800 g of methylene chloride, and the solution was cast on the support of a solution casting apparatus by a T-die method and dried in steps at a drying temperature of 30° C. and subsequently at 80° C. to obtain a film having a width of 150 mm and a thickness of 80 μm.

The total light transmittance, haze and retardation characteristics of the film obtained were measured, and the results thereof are shown together in Table 1.

The film obtained exhibited high total light transmittance, revealing excellent transparency, and was small in the haze but had a large out-of-plane retardation in the thickness direction (Rth) and failed in having the target optical characteristics.

Comparative Example 4

200 g of cellulose acetate butyrate used in Example 4 was dissolved in 800 g of methyl ethyl ketone, and the solution was cast on the support of a solution casting apparatus by a T-die method and dried in steps at a drying temperature of 30° C. and subsequently at 100° C. to obtain a film having a width of 150 mm and a thickness of 200 μm. The obtained film was cut into a 50-mm square and stretched at 150° C. to 1.5 times its length and 1.1 times its width.

The total light transmittance, haze and retardation characteristics of the optical compensation film obtained were measured, and the results thereof are shown together in Table 1.

The optical compensation film obtained exhibited high total light transmittance, revealing excellent transparency, and was small in the haze but failed in having optical characteristics of the in-plane retardation (Re) and the Nz coefficient being in the target ranges.

Example 8

130 g of cellulose butyrate (butyryl group=82 mol %, total degree of substitution DS=2.46, number average molecular weight=70,000), 30 g of the diisopropyl fumarate.diethyl fumarate polymer obtained in Synthesis Example 1 and 10 g of tricresyl phosphate (Δn=0.18) were dissolved in 640 g of methylene chloride, and the solution was cast on the support of a solution casting apparatus by a T-die method and dried in steps at a drying temperature of 30° C. and subsequently at 100° C. to obtain an optical compensation film (resin composition) having a width of 150 mm and a thickness of 150 μm [resin component (cellulose butyrate: 81 wt %, diisopropyl fumarate.diethyl fumarate polymer: 19 wt %): 94 wt %, tricresyl phosphate: 6 wt %]. The obtained optical compensation film was cut into a 50-mm square and stretched at 125° C. to 1.5 times its length and 1.1 times its width (thickness after stretching: 122 μm).

The total light transmittance, haze and retardation characteristics of the optical compensation film obtained were measured, and the results thereof are shown in Table 2.

TABLE 2

| | Light Transmittance (%) | Haze (%) | Re (nm) | Rth (nm) | Nz Coefficient |
|---|---|---|---|---|---|
| Example 8 | 90 | 0.9 | 137 | — | 0.5 |
| Example 9 | 92 | 0.5 | 140 | — | 0.45 |
| Example 10 | 91 | 0.8 | 150 | — | 0.6 |
| Example 11 | 91 | 0.7 | 110 | — | 0.5 |
| Example 12 | 91 | 0.8 | 120 | — | 0 |
| Example 13 | 90 | 0.8 | 257 | — | 0.5 |
| Example 14 | 92 | 0.7 | 0 | 0 | — |
| Example 15 | 91 | 0.7 | 145 | — | 0.5 |
| Example 16 | 90 | 0.6 | 127 | — | 0.5 |
| Example 17 | 91 | 0.7 | 105 | — | 0.45 |
| Example 18 | 90 | 0.8 | 108 | — | 0.49 |
| Example 19 | 90 | 0.7 | 117 | — | 0.51 |
| Example 20 | 91 | 0.7 | 115 | — | 0.52 |
| Example 21 | 90 | 0.8 | 104 | — | 0.48 |
| Example 22 | 90 | 0.8 | 108 | — | 0.5 |
| Example 23 | 91 | 0.7 | 162 | — | 0.55 |

The optical compensation film obtained exhibited high total light transmittance, revealing excellent transparency, was small in the haze and had optical characteristics of the in-plane retardation (Re) and the Nz coefficient being in the target ranges.

Example 9

130 g of cellulose acetate butyrate (acetyl group=15 mol %, butyryl group=70 mol %, total degree of substitution DS=2.55, number average molecular weight=72,000), 30 g of the diisopropyl fumarate.diethyl fumarate.vinylpyrrolidone polymer obtained in Synthesis Example 2 and 10 g of tricresyl phosphate (Δn=0.18) were dissolved in 640 g of methylene chloride, and the solution was cast on the support of a solution casting apparatus by a T-die method and dried in steps at a drying temperature of 30° C. and subsequently at 100° C. to obtain an optical compensation film (resin composition) having a width of 150 mm and a thickness of 150 μm [resin component (cellulose acetate butyrate: 81 wt %, diisopropyl fumarate.diethyl fumarate.vinylpyrrolione polymer: 19 wt %): 94 wt %, tricresyl phosphate: 6 wt %]. The obtained optical compensation film was cut into a 50-mm square and stretched at 125° C. to 1.5 times its length and 1.1 times its width (thickness after stretching: 123 μm).

The total light transmittance, haze and retardation characteristics of the optical compensation film obtained were measured, and the results thereof are shown together in Table 2.

The optical compensation film obtained exhibited high total light transmittance, revealing excellent transparency, was small in the haze and had optical characteristics of the in-plane retardation (Re) and the Nz coefficient being in the target ranges.

Example 10

158 g of cellulose butyrate (butyryl group=87 mol %, total degree of substitution DS=2.61, number average molecular weight=70,000), 12 g of the diisopropyl fumarate.diethyl fumarate polymer obtained in Synthesis Example 1 and 10 g of 2-ethylhexyldiphenyl phosphate (Δn=0.23) were dissolved in 800 g of methyl ethyl ketone, and the solution was cast on the support of a solution casting apparatus by a T-die method and dried in steps at a drying temperature of 30° C. and subsequently at 100° C. to obtain an optical compensation film (resin composition) having a width of 150 mm and a thickness of 150 μm [resin component (cellulose butyrate: 93 wt %, diisopropyl fumarate.diethyl fumarate polymer: 7 wt %): 95 wt %, 2-ethylhexyldiphenyl phosphate: 5 wt %]. The obtained optical compensation film was cut into a 50-mm square and stretched at 125° C. to 1.5 times its length and 1.1 times its width (thickness after stretching: 125 μm).

The total light transmittance, haze and retardation characteristics of the optical compensation film obtained were measured, and the results thereof are shown together in Table 2.

The optical compensation film obtained exhibited high total light transmittance, revealing excellent transparency, was small in the haze and had optical characteristics of the in-plane retardation (Re) and the Nz coefficient being in the target ranges.

Example 11

138 g of cellulose butyrate (butyryl group=86 mol %, total degree of substitution DS=2.58, number average molecular weight=70,000), 32 g of the diisopropyl fumarate.diethyl fumarate polymer obtained in Synthesis Example 1 and 10 g of 2-hydroxy-4-methoxybenzophenone (Δn=0.11) were dissolved in 800 g of methyl ethyl ketone, and the solution was cast on the support of a solution casting apparatus by a T-die method and dried in steps at a drying temperature of 30° C. and subsequently at 100° C. to obtain an optical compensation film (resin composition) having a width of 150 mm and a thickness of 150 μm [resin component (cellulose butyrate: 80 wt %, diisopropyl fumarate.diethyl fumarate polymer: 20 wt %): 94 wt %, 2-hydroxy-4-methoxybenzophenone: 6 wt %]. The obtained optical compensation film was cut into a 50-mm square and stretched at 125° C. to 1.5 times its length and 1.1 times its width (thickness after stretching: 120 μm).

The total light transmittance, haze and retardation characteristics of the optical compensation film obtained were measured, and the results thereof are shown together in Table 2.

The optical compensation film obtained exhibited high total light transmittance, revealing excellent transparency, was small in the haze and had optical characteristics of the in-plane retardation (Re) and the Nz coefficient being in the target ranges.

Example 12

54 g of cellulose acetate propionate (acetyl group=5 mol %, propionyl group=80 mol %, total degree of substitution DS=2.55, number average molecular weight=75,000), 116 g of the diisopropyl fumarate.di-2-ethylhexyl fumarate polymer obtained in Synthesis Example 5 and 10 g of tricresyl phosphate (Δn=0.18) were dissolved in 800 g of methyl ethyl ketone, and the solution was cast on the support of a solution casting apparatus by a T-die method and dried in steps at a drying temperature of 30° C. and subsequently at 100° C. to obtain an optical compensation film (resin composition) having a width of 150 mm and a thickness of 180 μm [resin component (cellulose acetate propionate: 32 wt %, diisopropyl fumarate.di-2-ethylhexyl fumarate polymer: 68 wt %): 94 wt %, tricresyl phosphate: 6 wt %]. The obtained optical compensation film was cut into a 50-mm square and stretched at 125° C. to 1.25 times its length and 1.05 times its width (thickness after stretching: 160 μm).

The total light transmittance, haze and retardation characteristics of the optical compensation film obtained were measured, and the results thereof are shown together in Table 2.

The optical compensation film obtained exhibited high total light transmittance, revealing excellent transparency, was small in the haze and had optical characteristics of the in-plane retardation (Re) and the Nz coefficient being in the target ranges.

Example 13

153 g of cellulose butyrate (butyryl group=82 mol %, total degree of substitution DS=2.46, number average molecular weight=70,000), 17 g of the diisopropyl fumarate.diethyl fumarate polymer obtained in Synthesis Example 1 and 20 g of tricresyl phosphate (Δn=0.18) were dissolved in 800 g of methylene chloride, and the solution was cast on the support of a solution casting apparatus by a T-die method and dried in steps at a drying temperature of 30° C. and subsequently at 100° C. to obtain an optical compensation film (resin composition) having a width of 150 mm and a thickness of 150 μm [resin component (cellulose butyrate: 90 wt %, diisopropyl fumarate.diethyl fumarate polymer: 10 wt %): 89 wt %, tricresyl phosphate: 11 wt %]. The obtained optical compensation film was cut into a 50-mm square and stretched at 125° C. to 2.0 times its length and 1.1 times its width (thickness after stretching: 106 μm).

The total light transmittance, haze and retardation characteristics of the optical compensation film obtained were measured, and the results thereof are shown together in Table 2.

The optical compensation film obtained exhibited high total light transmittance, revealing excellent transparency, was small in the haze and had optical characteristics of the in-plane retardation (Re) and the Nz coefficient being in the target ranges.

Example 14

153 g of cellulose butyrate (butyryl group=82 mol %, total degree of substitution DS=2.46, number average molecular weight=70,000), 17 g of the diisopropyl fumarate.diethyl fumarate polymer obtained in Synthesis Example 1 and 10 g of tricresyl phosphate (Δn=0.18) were dissolved in 800 g of methylene chloride, and the solution was cast on the support of a solution casting apparatus by a T-die method and dried in steps at a drying temperature of 30° C. and subsequently at 100° C. to obtain an optical compensation film (resin composition) having a width of 150 mm and a thickness of 80 μm [resin component (cellulose butyrate: 90 wt %, diisopropyl fumarate.diethyl fumarate polymer: 10 wt %): 94 wt %, tricresyl phosphate: 6 wt %].

The total light transmittance, haze and retardation characteristics of the optical compensation film obtained were measured, and the results thereof are shown together in Table 2.

The optical compensation film obtained exhibited high total light transmittance, revealing excellent transparency, was small in the haze and had optical characteristics of the in-plane retardation (Re) and the out-of-plane retardation in the thickness direction (Rth) being in the target ranges.

Example 15

153 g of cellulose butyrate (butyryl group=86 mol %, total degree of substitution DS=2.58, number average molecular weight=70,000), 17 g of the diisopropyl fumarate.diethyl fumarate polymer obtained in Synthesis Example 1 and 20 g of tricresyl phosphate (Δn=0.18) were dissolved in 800 g of methylene chloride, and the solution was cast on the support of a solution casting apparatus by a T-die method and dried in steps at a drying temperature of 30° C. and subsequently at 100° C. to obtain an optical compensation film (resin composition) having a width of 150 mm and a thickness of 100 μm [resin component (cellulose butyrate: 90 wt %, diisopropyl fumarate.diethyl fumarate polymer: 10 wt %): 89 wt %, tricresyl phosphate: 11 wt %]. The obtained optical compensation film was cut into a 50-mm square and stretched at 125° C. to 2.0 times its length and 1.1 times its width (thickness after stretching: 70 μm).

The total light transmittance, haze and retardation characteristics of the optical compensation film obtained were measured, and the results thereof are shown together in Table 2.

The optical compensation film obtained exhibited high total light transmittance, revealing excellent transparency, was small in the haze and had optical characteristics of the in-plane retardation (Re) and the Nz coefficient being in the target ranges.

Example 16

171 g of cellulose butyrate (butyryl group=86 mol %, total degree of substitution DS=2.58, number average molecular weight=70,000), 9 g of the diisopropyl fumarate.diethyl fumarate polymer obtained in Synthesis Example 1 and 20 g of tricresyl phosphate (Δn=0.18) were dissolved in 800 g of methylene chloride, and the solution was cast on the support of a solution casting apparatus by a T-die method and dried in steps at a drying temperature of 30° C. and subsequently at 100° C. to obtain an optical compensation film (resin composition) having a width of 150 mm and a thickness of 100 μm [resin component (cellulose butyrate: 95 wt %, diisopropyl fumarate.diethyl fumarate polymer: 5 wt %): 90 wt %, tricresyl phosphate: 10 wt %]. The obtained optical compensation film was cut into a 50-mm square and uniaxially stretched at 125° C. to 2.0 times its length (thickness after stretching: 70 μm).

The total light transmittance, haze and retardation characteristics of the optical compensation film obtained were measured, and the results thereof are shown together in Table 2.

The optical compensation film obtained exhibited high total light transmittance, revealing excellent transparency, was small in the haze and had optical characteristics of the in-plane retardation (Re) and the Nz coefficient being in the target ranges.

Example 17

130 g of cellulose butyrate (butyryl group=82 mol %, total degree of substitution DS=2.46, number average molecular weight=70,000), 30 g of the diisopropyl fumarate.diethyl fumarate polymer obtained in Synthesis Example 1 and 10 g of tributyl trimellitate (Δn=0.11) were dissolved in 800 g of methylene chloride, and the solution was cast on the support of a solution casting apparatus by a T-die method and dried in steps at a drying temperature of 30° C. and subsequently at 100° C. to obtain an optical compensation film (resin composition) having a width of 150 mm and a thickness of 180 μm [resin component (cellulose butyrate: 81 wt %, diisopropyl fumarate.diethyl fumarate polymer: 19 wt %): 94 wt %, tributyl trimellitate: 6 wt %]. The obtained optical compensation film was cut into a 50-mm square and stretched at 125° C. to 1.5 times its length 1.1 times its width (thickness after stretching: 145 μm).

The total light transmittance, haze and retardation characteristics of the optical compensation film obtained were measured, and the results thereof are shown together in Table 2.

The optical compensation film obtained exhibited high total light transmittance, revealing excellent transparency, was small in the haze and had optical characteristics of the in-plane retardation (Re) and the Nz coefficient being in the target ranges.

Example 18

130 g of cellulose butyrate (butyryl group=82 mol %, total degree of substitution DS=2.46, number average molecular weight=70,000), 30 g of the diisopropyl fumarate.diethyl fumarate polymer obtained in Synthesis Example 1 and 10 g of tetrabutyl pyromellitate (Δn=0.13) were dissolved in 800 g of methylene chloride, and the solution was cast on the support of a solution casting apparatus by a T-die method and dried in steps at a drying temperature of 30° C. and subsequently at 100° C. to obtain an optical compensation film (resin composition) having a width of 150 mm and a thickness of 180 μm [resin component (cellulose butyrate: 81 wt %, diisopropyl fumarate.diethyl fumarate polymer: 19 wt %): 94 wt %, tetrabutyl pyromellitate: 6 wt %]. The obtained optical compensation film was cut into a 50-mm square and stretched at 125° C. to 1.5 times its length and 1.1 times its width (thickness after stretching: 143 μm).

The total light transmittance, haze and retardation characteristics of the optical compensation film obtained were measured, and the results thereof are shown together in Table 2.

The optical compensation film obtained exhibited high total light transmittance, revealing excellent transparency, was small in the haze and had optical characteristics of the in-plane retardation (Re) and the Nz coefficient being in the target ranges.

Example 19

130 g of cellulose butyrate (butyryl group=82 mol %, total degree of substitution DS=2.46, number average molecular weight=70,000), 30 g of the diisopropyl fumarate.diethyl fumarate polymer obtained in Synthesis Example 1 and 7 g of 2-(2'-hydroxy-5'-tert-butylphenyl)benzotriazole (Δn=0.13) were dissolved in 800 g of methylene chloride, and the solution was cast on the support of a solution casting apparatus by a T-die method and dried in steps at a drying temperature of 30° C. and subsequently at 100° C. to obtain an optical compensation film (resin composition) having a width of 150 mm and a thickness of 180 μm [resin component (cellulose butyrate: 81 wt %, diisopropyl fumarate.diethyl fumarate polymer: 19 wt %): 96 wt %, 2-(2'-hydroxy-5'-tert-butylphenyl)benzotriazole: 4 wt %]. The obtained optical compensation film was cut into a 50-mm square and stretched at 125° C. to 1.5 times its length and 1.1 times its width (thickness after stretching: 141 μm).

The total light transmittance, haze and retardation characteristics of the optical compensation film obtained were measured, and the results thereof are shown together in Table 2.

The optical compensation film obtained exhibited high total light transmittance, revealing excellent transparency, was small in the haze and had optical characteristics of the in-plane retardation (Re) and the Nz coefficient being in the target ranges.

Example 20

130 g of cellulose butyrate (butyryl group=82 mol %, total degree of substitution DS=2.46, number average molecular weight=70,000), 30 g of the diisopropyl fumarate.diethyl fumarate polymer obtained in Synthesis Example 1 and 7 g of 2,4-diphenyl-6-(2-hydroxy-4-methoxyphenyl)-1,3,5-triazine (Δn=0.21) were dissolved in 800 g of methylene chloride, and the solution was cast on the support of a solution casting apparatus by a T-die method and dried in steps at a drying temperature of 30° C. and subsequently at 100° C. to obtain an optical compensation film (resin composition) having a width of 150 mm and a thickness of 180 μm [resin component (cellulose butyrate: 81 wt %, diisopropyl fumarate.diethyl fumarate polymer: 19 wt %): 96 wt %, 2,4-diphenyl-6-(2-hydroxy-4-methoxyphenyl)-1,3,5-triazine: 4 wt %]. The obtained optical compensation film was cut into a 50-mm square and stretched at 125° C. to 1.5 times its length and 1.1 times its width (thickness after stretching: 140 μm).

The total light transmittance, haze and retardation characteristics of the optical compensation film obtained were measured, and the results thereof are shown together in Table 2.

The optical compensation film obtained exhibited high total light transmittance, revealing excellent transparency, was small in the haze and had optical characteristics of the in-plane retardation (Re) and the Nz coefficient being in the target ranges.

Example 21

130 g of cellulose butyrate (butyryl group=82 mol %, total degree of substitution DS=2.46, number average molecular weight=70,000), 30 g of the diisopropyl fumarate.diethyl fumarate polymer obtained in Synthesis Example 1 and 20 g of ethyl benzoate (Δn=0.08) were dissolved in 800 g of methylene chloride, and the solution was cast on the support of a solution casting apparatus by a T-die method and dried in steps at a drying temperature of 30° C. and subsequently at 100° C. to obtain an optical compensation film (resin composition) having a width of 150 mm and a thickness of 180 μm [resin component (cellulose butyrate: 81 wt %, diisopropyl fumarate.diethyl fumarate polymer: 19 wt %): 89 wt %, ethyl benzoate: 11 wt %]. The obtained optical compensation film was cut into a 50-mm square and stretched at 125° C. to 1.5 times its length and 1.1 times its width (thickness after stretching: 148 μm).

The total light transmittance, haze and retardation characteristics of the optical compensation film obtained were measured, and the results thereof are shown together in Table 2.

The optical compensation film obtained exhibited high total light transmittance, revealing excellent transparency, was small in the haze and had optical characteristics of the in-plane retardation (Re) and the Nz coefficient being in the target ranges.

Example 22

130 g of cellulose butyrate (butyryl group=82 mol %, total degree of substitution DS=2.46, number average molecular weight=70,000), 30 g of the diisopropyl fumarate.diethyl fumarate polymer obtained in Synthesis Example 1 and 20 g of diethyl phthalate (Δn=0.07) were dissolved in 800 g of methylene chloride, and the solution was cast on the support of a solution casting apparatus by a T-die method and dried in steps at a drying temperature of 30° C. and subsequently at 100° C. to obtain an optical compensation film (resin composition) having a width of 150 mm and a thickness of 180 μm [resin component (cellulose butyrate: 81 wt %, diisopropyl fumarate.diethyl fumarate polymer: 19 wt %): 89 wt %, diethyl phthalate: 11 wt %]. The obtained optical compensation film was cut into a 50-mm square and stretched at 125° C. to 1.5 times its length and 1.1 times its width (thickness after stretching: 149 μm).

The total light transmittance, haze and retardation characteristics of the optical compensation film obtained were measured, and the results thereof are shown together in Table 2.

The optical compensation film obtained exhibited high total light transmittance, revealing excellent transparency, was small in the haze and had optical characteristics of the in-plane retardation (Re) and the Nz coefficient being in the target ranges.

Example 23

130 g of cellulose butyrate (butyryl group=82 mol %, total degree of substitution DS=2.46, number average molecular weight=70,000), 30 g of the diisopropyl fumarate.diethyl fumarate polymer obtained in Synthesis Example 1 and 53 g of tricresyl phthalate were dissolved in 640 g of methylene chloride, and the solution was cast on the support of a solution casting apparatus by a T-die method and dried in steps at a drying temperature of 30° C. and subsequently at 100° C. to obtain an optical compensation film (resin composition) having a width of 150 mm and a thickness of 150 μm [resin component (cellulose butyrate: 81 wt %, diisopropyl fumarate.diethyl fumarate polymer: 19 wt %): 75 wt %, tricresyl phthalate: 25 wt %]. The obtained optical compensation film was cut into a 50-mm square and stretched at 120° C. to 1.5 times its length and 1.1 times its width (thickness after stretching: 121 μm).

The total light transmittance, haze and retardation characteristics of the optical compensation film obtained were measured, and the results thereof are shown in Table 2.

The optical compensation film obtained exhibited high total light transmittance, revealing excellent transparency, was small in the haze and had optical characteristics of the in-plane retardation (Re) and the Nz coefficient being in the target ranges.

Comparative Example 5

200 g of cellulose butyrate used in Example 8 and 10 g of tricresyl phosphate (Δn=0.18) were dissolved in 800 g of methylene chloride, and the solution was cast on the support of a solution casting apparatus by a T-die method and dried in steps at a drying temperature of 30° C. and subsequently at 80° C. to obtain a film (resin composition) having a width of 150 mm and a thickness of 80 μm (cellulose butyrate: 95 wt %, tricresyl phosphate: 5 wt %).

The total light transmittance, haze and retardation characteristics of the film obtained were measured, and the results thereof are shown in Table 3.

TABLE 3

| | Light Transmittance (%) | Haze (%) | Re (nm) | Rth (nm) | Nz Coefficient |
|---|---|---|---|---|---|
| Comparative Example 5 | 90 | 0.5 | 0 | 60 | — |
| Comparative Example 6 | 91 | 0.7 | 2 | 54 | — |
| Comparative Example 7 | 91 | 0.6 | 1 | −275 | — |
| Comparative Example 8 | 90 | 0.8 | 351 | — | 1.4 |
| Comparative Example 9 | 91 | 0.7 | 169 | — | 1.3 |
| Comparative Example 10 | 91 | 0.7 | 38 | — | 1.2 |

The film obtained exhibited high total light transmittance, revealing excellent transparency, and was small in the haze but had a large retardation in the thickness direction (Rth) and failed in having the target optical characteristics.

Comparative Example 6

200 g of cellulose acetate butyrate used in Example 9 and 10 g of tricresyl phosphate (Δn=0.18) were dissolved in 800 g of tetrahydrofuran, and the solution was cast on the support of a solution casting apparatus by a T-die method and dried in steps at a drying temperature of 30° C. and subsequently at 80° C. to obtain a film (resin composition) having a width of 150 mm and a thickness of 77 μm (cellulose acetate butyrate: 95 wt %, tricresyl phosphate: 5 wt %).

The total light transmittance, haze and retardation characteristics of the film obtained were measured, and the results thereof are shown together in Table 3.

The film obtained exhibited high total light transmittance, revealing excellent transparency, and was small in the haze but had a large out-of-plane retardation in the thickness direction (Rth) and failed in having the target optical characteristics.

Comparative Example 7

200 g of diisopropyl fumarate.diethyl fumarate polymer used in Example 8 and 10 g of tricresyl phosphate (Δn=0.18) were dissolved in 800 g of methylene chloride, and the solution was cast on the support of a solution casting apparatus by a T-die method and dried in steps at a drying temperature of 30° C. and subsequently at 80° C. to obtain a film (resin composition) having a width of 150 mm and a thickness of 80 μm (resin component: 95 wt %, tricresyl phosphate: 5 wt %).

The total light transmittance, haze and retardation characteristics of the film obtained were measured, and the results thereof are shown together in Table 3.

The film obtained exhibited high total light transmittance, revealing excellent transparency, and was small in the haze but had a large out-of-plane retardation in the thickness direction (Rth) and failed in having the target optical characteristics.

Comparative Example 8

200 g of cellulose acetate butyrate used in Example 9 and 10 g of tricresyl phosphate (Δn=0.18) were dissolved in 800 g of methyl ethyl ketone, and the solution was cast on the support of a solution casting apparatus by a T-die method and dried in steps at a drying temperature of 30° C. and subsequently at 100° C. to obtain an optical compensation film (resin composition) having a width of 150 mm and a thickness of 200 μm (cellulose acetate butyrate: 95 wt %, tricresyl phosphate: 5 wt %). The obtained optical compensation film was cut into a 50-mm square and stretched at 125° C. to 1.5 times its length and 1.1 times its width (thickness after stretching: 163 μm).

The total light transmittance, haze and retardation characteristics of the optical compensation film obtained were measured, and the results thereof are shown together in Table 3.

The optical compensation film obtained exhibited high total light transmittance, revealing excellent transparency, and was small in the haze but failed in having optical characteristics of the in-plane retardation (Re) and the Nz coefficient being in the target ranges.

Comparative Example 9

11 g of cellulose butyrate (butyryl group=82 mol %, total degree of substitution DS=2.46, number average molecular weight=70,000), 159 g of the diisopropyl fumarate.diethyl fumarate polymer obtained in Synthesis Example 1 and 10 g of tricresyl phosphate (Δn=0.18) were dissolved in 800 g of methylene chloride, and the solution was cast on the support of a solution casting apparatus by a T-die method and dried in steps at a drying temperature of 30° C. and subsequently at 100° C. to obtain an optical compensation film (resin composition) having a width of 150 mm and a thickness of 200 μm [resin component (cellulose butyrate: 6 wt %, diisopropyl fumarate.diethyl fumarate polymer: 94 wt %): 94 wt %, tricresyl phosphate: 6 wt %]. The obtained optical compensation film was cut into a 50-mm square and stretched at 125° C. to 1.5 times its length and 1.1 times its width (thickness after stretching: 164 μm).

The total light transmittance, haze and retardation characteristics of the optical compensation film obtained were measured, and the results thereof are shown together in Table 3.

The optical compensation film obtained exhibited high total light transmittance, revealing excellent transparency, and was small in the haze but failed in having optical characteristics of the Nz coefficient being in the target range.

Comparative Example 10

145 g of cellulose butyrate (butyryl group=82 mol %, total degree of substitution DS=2.46, number average molecular weight=70,000), 25 g of the diisopropyl fumarate.diethyl fumarate polymer obtained in Synthesis Example 1 and 91 g of tricresyl phosphate (Δn=0.18) were dissolved in 800 g of methylene chloride, and the solution was cast on the support of a solution casting apparatus by a T-die method and dried in steps at a drying temperature of 30° C. and subsequently at 100° C. to obtain a resin composition (optical compensation film) having a width of 150 mm and a thickness of 200 μm (resin component (cellulose butyrate: 85 wt %, diisopropyl fumarate.diethyl fumarate polymer: 15 wt %): 65 wt %, tricresyl phosphate: 35 wt %). The obtained optical compensation film was cut into a 50-mm square and stretched at 125° C. to 1.5 times its length and 1.1 times its width (thickness after stretching: 162 μm).

The total light transmittance, haze and retardation characteristics of the optical compensation film obtained were measured, and the results thereof are shown together in Table 3.

The optical compensation film obtained exhibited high total light transmittance, revealing excellent transparency, and was small in the haze but failed in having optical characteristics of the in-plane retardation (Re) and the Nz coefficient being in the target ranges.

While the invention has been described in detail and with reference to specific embodiments thereof, it will be apparent to one skilled in the art that various changes and modifications can be made therein without departing from the spirit and scope of present invention.

This application is based on Japanese Patent Application (Patent Application No. 2011-166594) filed on Jul. 29, 2011, and Japanese Patent Application (Patent Application No. 2012-141108) filed on Jun. 22, 2012, the entirety of which is incorporated herein by way of reference. Also, all references cited herein are incorporated by reference in their entirety.

INDUSTRIAL APPLICABILITY

The optical compensation film using the resin composition of the present invention exhibits specific retardation characteristics and therefore, is useful as an optical compensation film or an antireflection film for liquid crystal displays. Accordingly, the industrial value of the present invention is outstanding.

The invention claimed is:

1. A resin composition, comprising:
   from 30 to 99 wt % of a cellulose-based resin of formula (1):

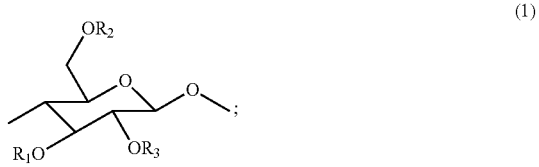

and
   from 70 to 1 wt % of a fumaric acid diester polymer comprising 60 mol % or more of a fumaric acid diester residue unit of formula (2):

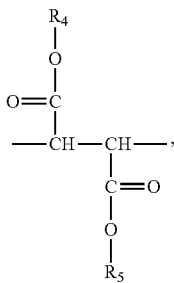

(2)

wherein:
$R_1$, $R_2$ and $R_3$ are each independently hydrogen or an acyl group having a carbon number of from 1 to 12; and
$R_4$ and $R_5$ are each independently an alkyl group having a carbon number of from 1 to 12.

2. An additive-containing resin composition, comprising: to 99.99 wt % of the resin composition of claim 1; and
from 0.01 to 30 wt % of an additive comprising an aromatic hydrocarbon ring or aromatic heterocyclic ring.

3. The resin composition according to claim 1, wherein an acylation degree of the cellulose-based resin of formula (1) is from 1.5 to 3.0.

4. The resin composition according to claim 1, wherein the fumaric acid diester polymer comprises:
from 60 to 95 mol % of a diisopropyl fumarate residue unit; and
from 5 to 40 mol % of a fumaric acid diester residue unit selected from the group consisting of a diethyl fumarate residue unit, a di-n-propyl fumarate residue unit, a di-n-butyl fumarate residue unit and a di-2-ethylhexyl fumarate residue unit.

5. The additive-containing resin composition according to claim 2, wherein the additive has a birefringence Δn of formula (5) of 0.05 or more:

$$\Delta n = ny - nx \qquad (5)$$

wherein:
nx is a refractive index in a fast axis direction of the additive molecule; and
ny is a refractive index in a slow axis direction of the additive molecule.

6. The resin composition according to claim 2, wherein the additive comprises from 1 to 12 aromatic hydrocarbon rings or aromatic heterocyclic rings in a molecule.

7. An optical compensation film, comprising the resin composition according to claim 1.

8. The optical compensation film according to claim 7, wherein a thickness of the film is from 5 to 200 μm.

9. An optical compensation film, comprising the additive-containing resin composition according to claim 2 and having a thickness of from 5 to 200 μm.

10. The optical compensation film according to claim 7, wherein an in-plane retardation (Re) of formula (2) is from 80 to 300 nm, and an Nz coefficient of formula (3) is from 0.35 to 0.65:

$$Re = (ny - nx) \times d \qquad (2)$$

$$Nz = (ny - nz)/(ny - nx) \qquad (3),$$

wherein:
nx is a refractive index in a fast axis direction in a film plane;
ny is a refractive index in a slow axis direction in a film plane;
nz is a refractive index in an out-of-film plane direction; and
d is a film thickness.

11. The optical compensation film according to claim 7, wherein an in-plane retardation (Re) of formula (2) is from 50 to 200 nm, and an Nz coefficient of formula (3) is from −0.2 to 0.2:

$$Re = (ny - nx) \times d \qquad (2)$$

$$Nz = (ny - nz)/(ny - nx) \qquad (3),$$

wherein:
nx is a refractive index in a fast axis direction in a film plane;
ny is a refractive index in a slow axis direction in a film plane;
nz is a refractive index in an out-of-film plane direction; and
d is a film thickness.

12. The optical compensation film according to claim 7, wherein an in-plane retardation (Re) of formula (2) is from 0 to 20 nm, and an out-of-plane retardation (Rth) of formula (4) is from −150 to 10 nm:

$$Re = (ny - nx) \times d \qquad (2)$$

$$Rth = [(nx + ny)/2 - nz] \times d \qquad (4)$$

wherein:
nx is a refractive index in a fast axis direction in a film plane;
ny is a refractive index in a slow axis direction in a film plane;
nz is a refractive index in an out-of-film plane direction; and
d is a film thickness.

13. The optical compensation film according to claim 7, wherein a light transmittance of the film is 85% or more.

14. The optical compensation film according to claim 7, wherein a haze of the film is 2% or less.

15. A method for producing the optical compensation film according to claim 7, the method comprising:
dissolving from 10 to 99 wt % of the cellulose-based resin of formula (1) and from 90 to 1 wt % of the fumaric acid diester polymer in a solvent;
casting an obtained resin solution on a base material; and
after drying, separating a resulting film from the base material.

16. A method for producing the optical compensation film according to claim 9, the method comprising:
dissolving from 70 to 99.99 wt % of the resin composition and from 0.01 to 30 wt % of the additive a solvent;
casting an obtained resin solution on a base material; and
after drying, separating a resulting film from the base material.

17. The method according to claim 15, wherein an acylation degree of the cellulose-based resin of formula (1) is from 1.5 to 3.0.

18. The method according to claim 15, wherein the fumaric acid diester polymer comprises:
from 60 to 95 mol % of a diisopropyl fumarate residue unit; and
from 5 to 40 mol % of a fumaric acid diester residue unit selected from the group consisting of a diethyl fumarate residue unit, a di-n-propyl fumarate residue unit, a di-n-butyl fumarate residue unit and a di-2-ethylhexyl fumarate residue unit.

19. A method for producing the optical compensation film according to claim 10, the method comprising stretching a film obtained by casting the resin composition at least in a uniaxial direction.

20. A method for producing the optical compensation film according to claim 10, the method comprising uniaxially stretching or unbalanced biaxially stretching a film having a thickness of 40 to 200 μm obtained by casting the resin composition.

21. A method for producing the optical compensation film according to claim 11, comprising stretching a film obtained by casting the resin composition at least in a uniaxial direction.

22. A method for producing the optical compensation film according to claim 11, the method comprising uniaxially stretching or unbalanced biaxially stretching a film having a thickness of 40 to 200 μm obtained by casting the resin composition.

\* \* \* \* \*